US011956851B2

United States Patent
Narula et al.

(10) Patent No.: US 11,956,851 B2
(45) Date of Patent: Apr. 9, 2024

(54) SIDELINK COMMUNICATION USING A CELLULAR DISCONTINUOUS RECEPTION CONFIGURATION

(71) Applicant: QUALCOMM Incorporated, San Diego, CA (US)

(72) Inventors: Mohit Narula, San Diego, CA (US); Shuanshuan Wu, San Diego, CA (US); Sudhir Kumar Baghel, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/179,445

(22) Filed: Mar. 7, 2023

(65) Prior Publication Data

US 2023/0209650 A1    Jun. 29, 2023

Related U.S. Application Data

(63) Continuation of application No. 17/094,556, filed on Nov. 10, 2020, now Pat. No. 11,622,411.

(Continued)

(51) Int. Cl.
*H04W 76/28* (2018.01)
*H04L 41/0803* (2022.01)
(Continued)

(52) U.S. Cl.
CPC ......... *H04W 76/28* (2018.02); *H04L 41/0803* (2013.01); *H04W 72/23* (2023.01); *H04W 72/0446* (2013.01)

(58) Field of Classification Search
CPC ............... H04W 76/28; H04W 72/042; H04W 72/0446; H04L 41/0803
See application file for complete search history.

(56) References Cited

U.S. PATENT DOCUMENTS

2019/0174411 A1\*  6/2019  Xu ..................... H04W 52/0216
2019/0215896 A1\*  7/2019  Zhou .................... H04L 1/0027
2021/0185761 A1    6/2021  Narula

FOREIGN PATENT DOCUMENTS

| EP | 3500028 A1 | 6/2019 |
| WO | 2010105532 A1 | 9/2010 |
| WO | 2018064477 A1 | 4/2018 |

OTHER PUBLICATIONS

International Search Report and Written Opinion—PCT/US2020/059967—ISA/EPO—dated Feb. 18, 2021.

\* cited by examiner

*Primary Examiner* — Samina F Choudhry

(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a discontinuous reception (DRX) configuration to be used by the UE for cellular communication with the base station, wherein the DRX configuration indicates a DRX cycle that includes an active time during which the UE is to monitor a physical downlink control channel (PDCCH) and an inactive time during which the UE is to refrain from monitoring the PDCCH; identify a time window for sidelink communication with another UE based at least in part on the DRX configuration; and communicate using one or more sidelink resources in the identified time window. Numerous other aspects are provided.

30 Claims, 11 Drawing Sheets

Related U.S. Application Data

(60) Provisional application No. 62/947,983, filed on Dec. 13, 2019.

(51) Int. Cl.
*H04W 72/23* (2023.01)
*H04W 72/0446* (2023.01)

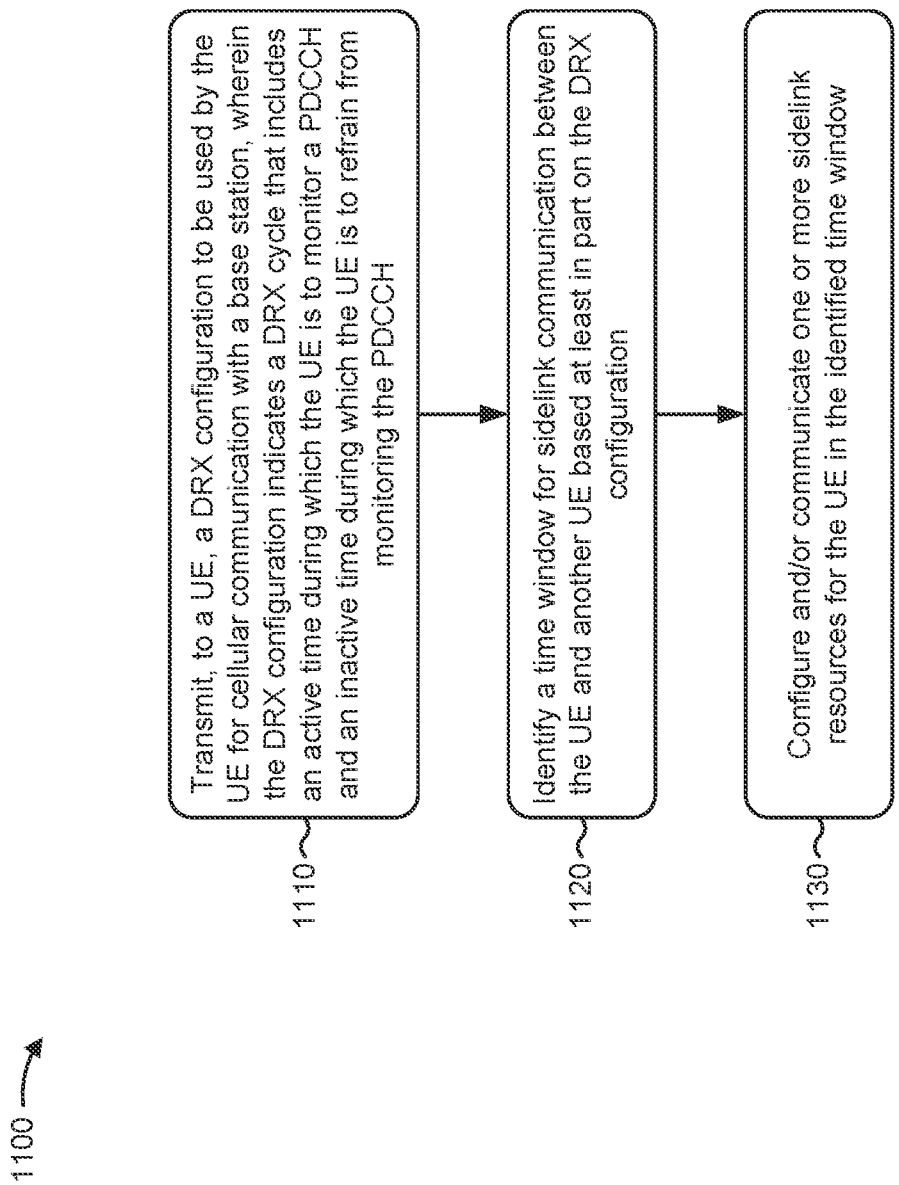

SIDELINK COMMUNICATION USING A CELLULAR DISCONTINUOUS RECEPTION CONFIGURATION

CROSS-REFERENCE TO RELATED APPLICATIONS

This application is a continuation of U.S. patent application Ser. No. 17/094,556, filed Nov. 10, 2020, entitled "SIDELINK COMMUNICATION USING A CELLULAR DISCONTINUOUS RECEPTION CONFIGURATION," which claims priority to U.S. Provisional Patent Application No. 62/947,983, filed on Dec. 13, 2019, entitled "SIDELINK COMMUNICATION USING A CELLULAR DISCONTINUOUS RECEPTION CONFIGURATION," and assigned to the assignee hereof. The disclosures of both Applications are considered part of and are incorporated by reference in this Patent Application.

FIELD OF THE DISCLOSURE

Aspects of the present disclosure generally relate to wireless communication and to techniques and apparatuses for sidelink communication using a cellular discontinuous reception configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station, a discontinuous reception (DRX) configuration to be used by the UE for cellular communication with the base station, wherein the DRX configuration indicates a DRX cycle that includes an active time during which the UE is to monitor a physical downlink control channel (PDCCH) and an inactive time during which the UE is to refrain from monitoring the PDCCH; identifying a time window for sidelink communication with another UE based at least in part on the DRX configuration; and communicating using one or more sidelink resources in the identified time window.

In some aspects, a method of wireless communication, performed by a base station, may include transmitting, to a UE, a DRX configuration to be used by the UE for cellular communication with the base station, wherein the DRX configuration indicates a DRX cycle that includes an active time during which the UE is to monitor a PDCCH and an inactive time during which the UE is to refrain from monitoring the PDCCH; identifying a time window for sidelink communication between the UE and another UE based at least in part on the DRX configuration; and configuring one or more sidelink resources for the UE in the identified time window.

In some aspects, a UE for wireless communication may include memory and one or more processors operatively coupled to the memory. The memory and the one or more processors may be configured to receive, from a base station, a DRX configuration to be used by the UE for cellular communication with the base station, wherein the DRX configuration indicates a DRX cycle that includes an active time during which the UE is to monitor a PDCCH and an inactive time during which the UE is to refrain from monitoring the PDCCH; identify a time window for sidelink communication with another UE based at least in part on the DRX configuration; and communicate using one or more sidelink resources in the identified time window.

In some aspects, a base station for wireless communication may include memory and one or more processors operatively coupled to the memory. The memory and the one or more processors may be configured to transmit, to a UE, a DRX configuration to be used by the UE for cellular communication with the base station, wherein the DRX configuration indicates a DRX cycle that includes an active time during which the UE is to monitor a PDCCH and an inactive time during which the UE is to refrain from monitoring the PDCCH; identify a time window for sidelink communication between the UE and another UE based at least in part on the DRX configuration; and configure one or more sidelink resources for the UE in the identified time window.

In some aspects, a non-transitory computer-readable medium may store one or more instructions for wireless communication. The one or more instructions, when executed by one or more processors of a UE, may cause the one or more processors to: receive, from a base station, a DRX configuration to be used by the UE for cellular communication with the base station, wherein the DRX configuration indicates a DRX cycle that includes an active time during which the UE is to monitor a PDCCH and an inactive time during which the UE is to refrain from monitoring the PDCCH; identify a time window for sidelink communication with another UE based at least in part on the DRX configuration; and communicate using one or more sidelink resources in the identified time window.

In some aspects, a non-transitory computer-readable medium may store one or more instructions for wireless communication. The one or more instructions, when executed by one or more processors of a base station, may cause the one or more processors to: transmit, to a UE, a DRX configuration to be used by the UE for cellular communication with the base station, wherein the DRX configuration indicates a DRX cycle that includes an active time during which the UE is to monitor a PDCCH and an inactive time during which the UE is to refrain from monitoring the PDCCH; identify a time window for sidelink communication between the UE and another UE based at least in part on the DRX configuration; and configure one or more sidelink resources for the UE in the identified time window.

In some aspects, an apparatus for wireless communication may include means for receiving, from a base station, a DRX configuration to be used by the apparatus for cellular communication with the base station, wherein the DRX configuration indicates a DRX cycle that includes an active time during which the apparatus is to monitor a PDCCH and an inactive time during which the apparatus is to refrain from monitoring the PDCCH; means for identifying a time window for sidelink communication with another apparatus based at least in part on the DRX configuration; and means for communicating using one or more sidelink resources in the identified time window.

In some aspects, an apparatus for wireless communication may include means for transmitting, to a UE, a DRX configuration to be used by the UE for cellular communication with the apparatus, wherein the DRX configuration indicates a DRX cycle that includes an active time during which the UE is to monitor a PDCCH and an inactive time during which the UE is to refrain from monitoring the PDCCH; means for identifying a time window for sidelink communication between the UE and another UE based at least in part on the DRX configuration; and means for configuring one or more sidelink resources for the UE in the identified time window.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
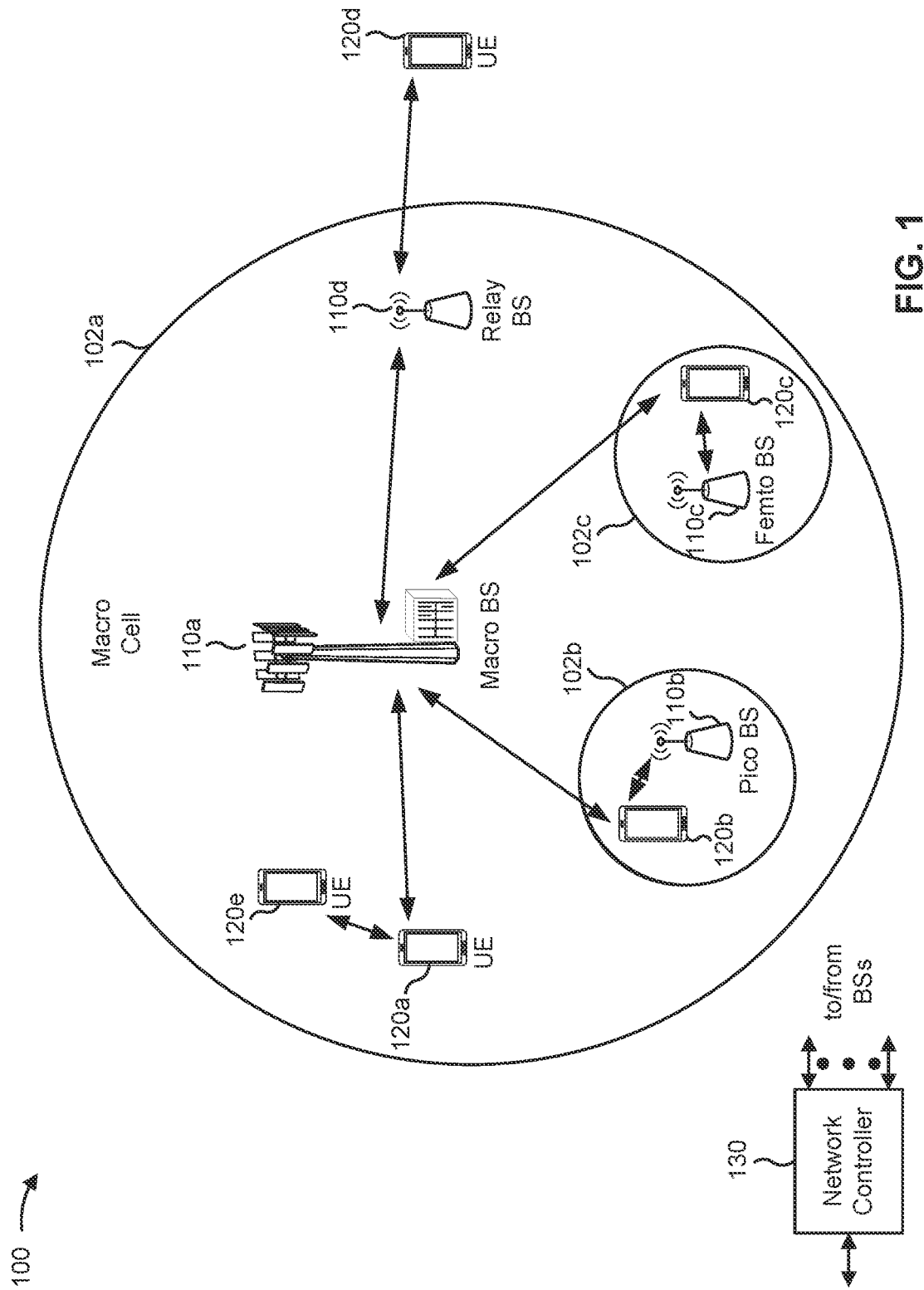
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
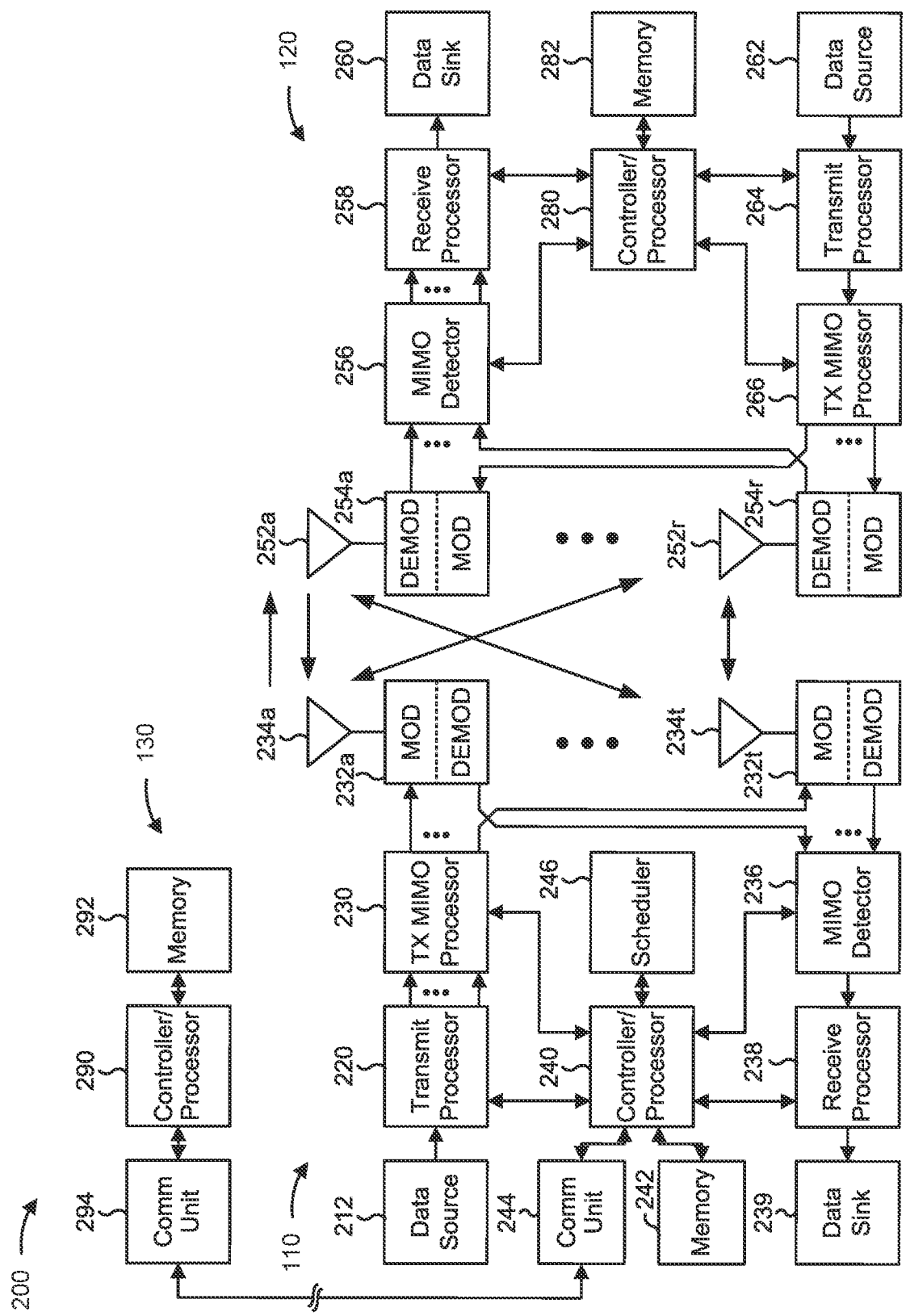
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink communication using a cellular discontinuous reception configuration, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1000 of FIG. 10, process 1100 of FIG. 11, and/or other processes as described herein. A scheduler 246 may schedule UEs for data transmission on the downlink and/or uplink.

In some aspects, UE 120 may include means for receiving, from a base station, a DRX configuration to be used by the UE 120 for cellular communication with the base station, wherein the DRX configuration indicates a DRX cycle that includes an active time during which the UE 120 is to monitor a PDCCH and an inactive time during which the UE 120 is to refrain from monitoring the PDCCH; means for identifying a time window for sidelink communication with another UE 120 based at least in part on the DRX configuration; means for communicating using one or more sidelink resources in the identified time window; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a DRX configuration to be used by the UE for cellular communication with the base station 110, wherein the DRX configuration indicates a DRX cycle that includes an active time during which the UE is to monitor a PDCCH and an inactive time during which the UE is to refrain from monitoring the PDCCH; means for identifying a time window for sidelink communication between the UE and another UE based at least in part on the DRX configuration; means for configuring one or more sidelink resources for the UE in the identified time window; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
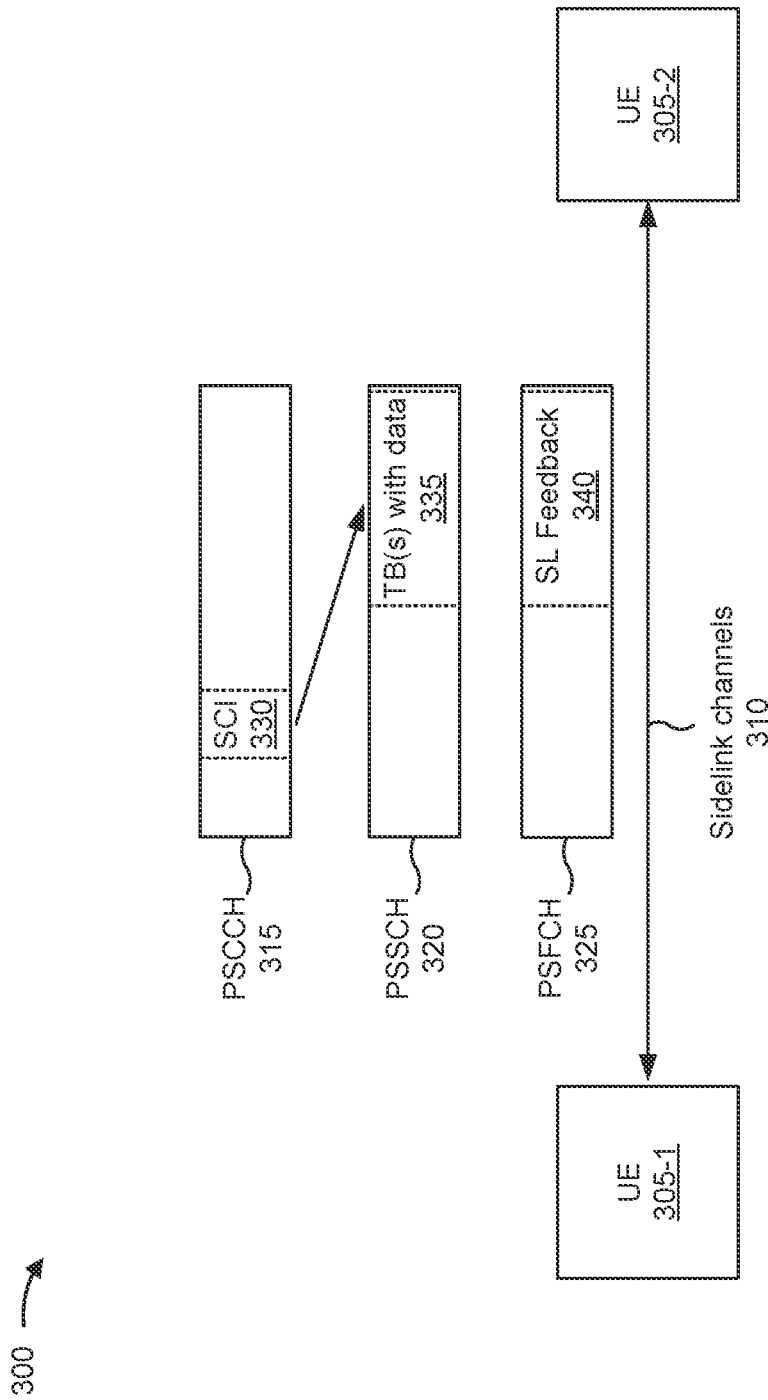
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), a mesh network, and/or the like. In some aspects, the UEs 305 may correspond to one or more other UEs described elsewhere herein, such as UE 120. In some aspects, the sidelink channel 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the sidelink channel 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 that includes data is carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the sidelink channel 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
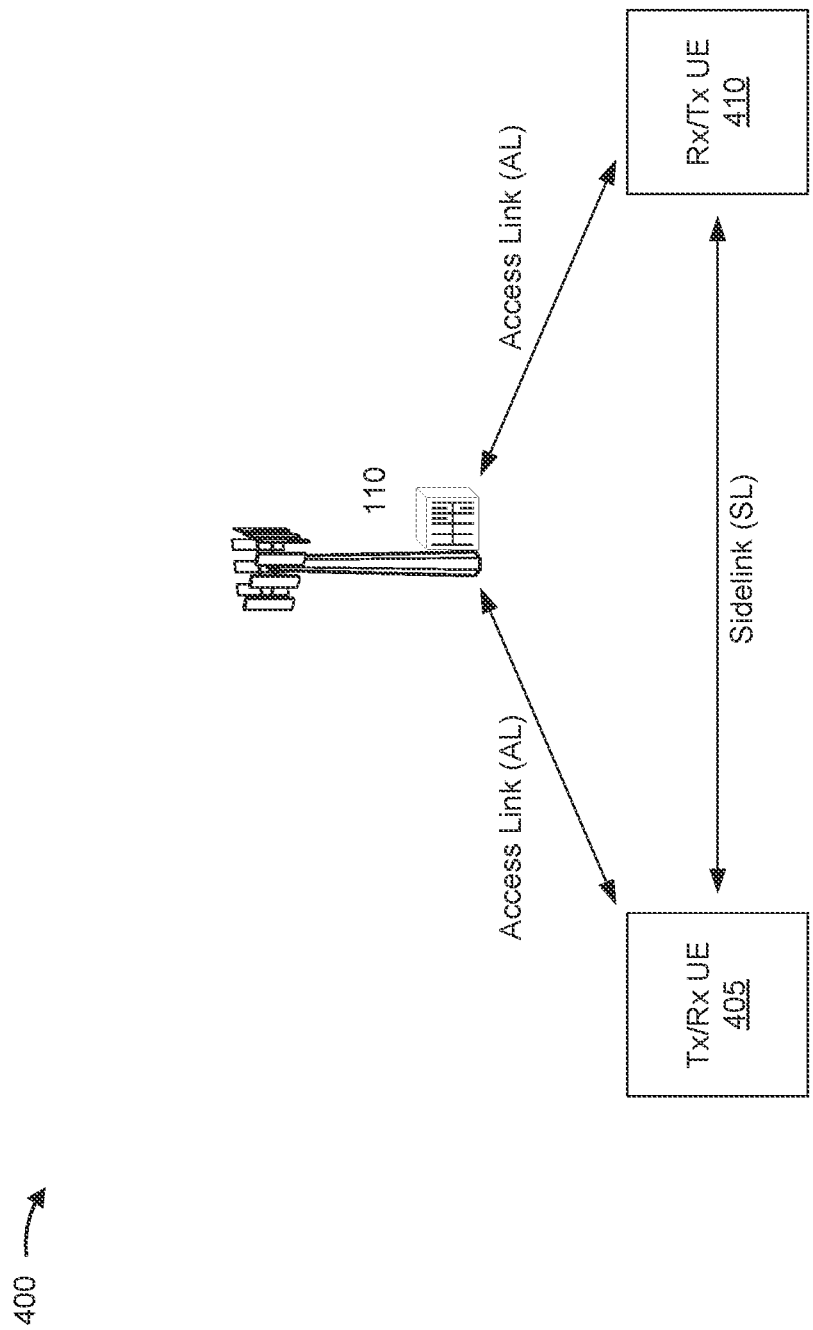
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. In FIG. 4, the Tx UE 405 is shown as Tx/Rx UE because the UE 405 may be capable of transmitting and receiving at the same time, or may transmit at one time and receive at another time. Similarly, the Rx UE 410 is shown as Rx/Tx UE because the UE 410 may be capable of transmitting and receiving at the same time, or may transmit at one time and receive at another time. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, "sidelink" may refer to a direct link between UEs 120, and "access link" may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110). In some aspects, an access link communication may be referred to as a cellular communication. In some aspects, cellular communications may be subject to a discontinuous reception configuration, as described below in connection with FIG. 5.

As indicated above, FIG. 4 is provided as an example. Other examples may differ from what is described with respect to FIG. 4.

Figure 5:
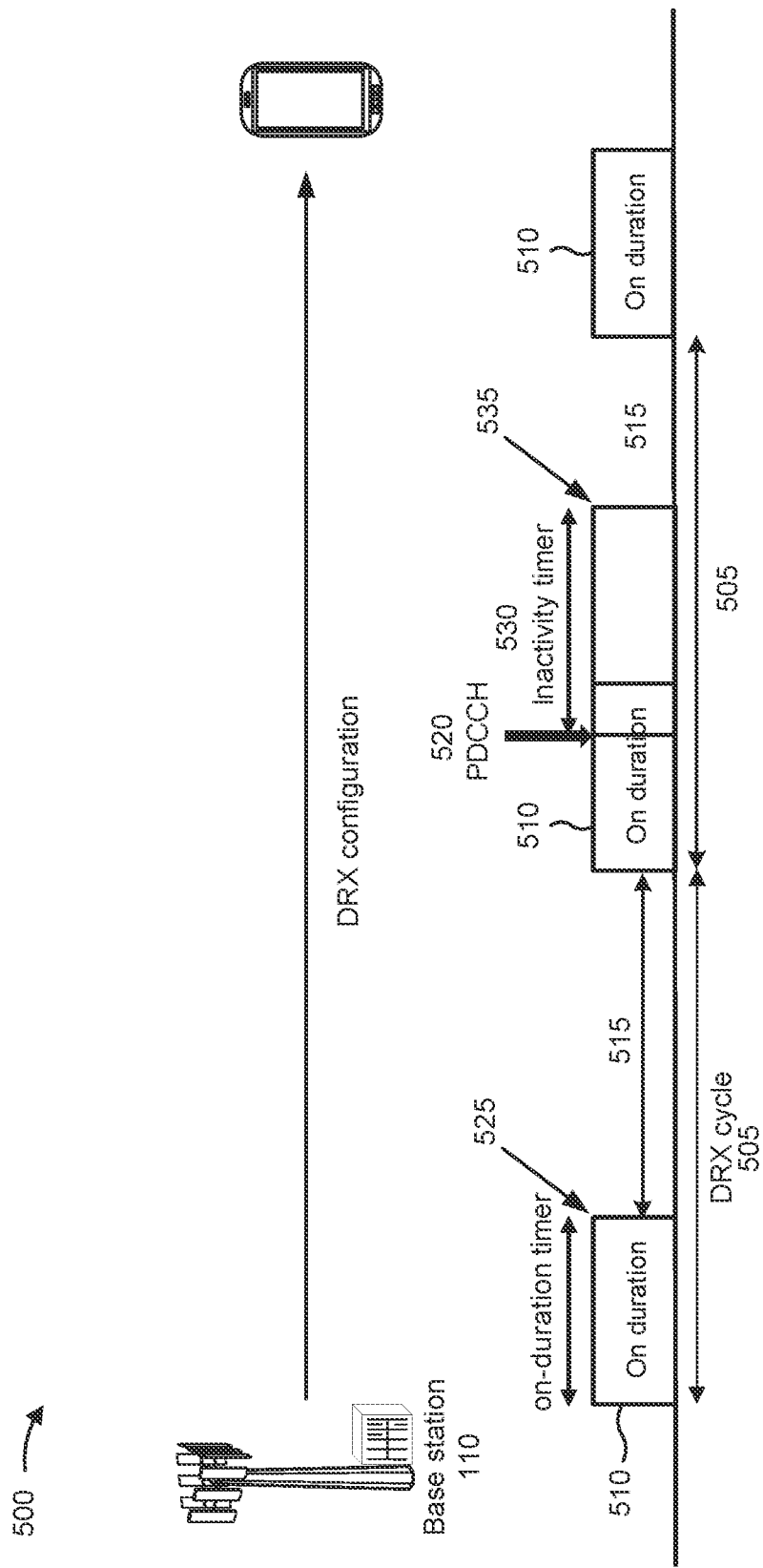
FIG. 5 is a diagram illustrating an example of a discontinuous reception (DRX) configuration, in accordance with various aspects of the present disclosure.

FIG. 5 is a diagram illustrating an example 500 of a discontinuous reception (DRX) configuration, in accordance with various aspects of the present disclosure.

As shown in FIG. 5, a base station 110 may transmit a DRX configuration to a UE 120 to configure a DRX cycle 505 for the UE 120. A DRX cycle 505 may include a DRX on duration 510 (e.g., during which a UE 120 is awake or in an active state) and an opportunity to enter a DRX sleep state 515. As used herein, the time during which the UE 120 is configured to be in an active state during the DRX on duration 510 may be referred to as an active time, and the time during which the UE 120 is configured to be in the DRX sleep state 515 may be referred to as an inactive time. As described below, the UE 120 may monitor a physical downlink control channel (PDCCH) during the active time, and may refrain from monitoring the PDCCH during the inactive time.

During the DRX on duration 510 (e.g., the active time), the UE 120 may monitor a downlink control channel (e.g., a PDCCH), as shown by reference number 520. For example, the UE 120 may monitor the PDCCH for downlink control information (DCI) pertaining to the UE 120. If the UE 120 does not detect and/or successfully decode any PDCCH communications intended for the UE 120 during the DRX on duration 510, then the UE 120 may enter the sleep state 515 (e.g., for the inactive time) at the end of the DRX on duration 510, as shown by reference number 525. In this way, the UE 120 may conserve battery power and reduce power consumption. As shown, the DRX cycle 505 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 530 (e.g., which may extend the active time). The UE 120 may start the DRX inactivity timer 530 at a time at which the PDCCH communication is received (e.g., in a transmission time interval (TTI) in which the PDCCH communication is received, such as a slot, a subframe, and/or the like). The UE 120 may remain in the active state until the DRX inactivity timer 530 expires, at which time the UE 120 may enter the sleep state 515 (e.g., for the inactive time), as shown by reference number 535. During the duration of the DRX inactivity timer 530, the UE 120 may continue to monitor for PDCCH communications, may obtain a downlink data communication (e.g., on a downlink data channel, such as a physical downlink shared channel (PDSCH)) scheduled by the PDCCH communication, may prepare and/or transmit an uplink communication (e.g., on a physical uplink shared channel (PUSCH)) scheduled by the PDCCH communication, and/or the like. The UE 120 may restart the DRX inactivity timer 530 after each detection of a PDCCH communication for the UE 120 for an initial transmission (e.g., but not for a retransmission).

By operating in this manner, the UE 120 may conserve battery power and reduce power consumption by entering the sleep state 515. However, the DRX configuration may only apply to cellular communications (e.g., access link communications) between the UE 120 and the base station 110, such as uplink communications or downlink communications. Traditionally, power consumption has not been an important issue for UEs 120 that use sidelink communication, such as V2X communication, because such UEs 120 are typically integrated into vehicles, and battery power is not a constraint on such UE operation. However, some UEs 120 that communicate using sidelink communications, such as V2X communications (e.g., V2P communications), may not be integrated into vehicles, and may have limited battery power. For example, UEs 120 carried by a pedestrian, a cyclist, and/or the like may be power-limited.

Some techniques and apparatuses described herein enable a UE 120 to identify a time window for sidelink communication based at least in part on a DRX configuration intended for cellular (e.g., access link) communication. This may enable the UE 120 to monitor for and/or transmit sidelink communications in a limited time window rather than continuously monitoring for and/or transmitting sidelink communications, thereby conserving UE resources, reducing UE power consumption, and conserving UE battery power. Furthermore, some techniques and apparatuses described herein permit improved network scheduling and coordination. Although FIG. 5 shows a connected mode DRX (CDRX) configuration, the techniques and apparatuses described herein equally apply to an idle mode DRX configuration, which may include recurring active times and inactive times.

As indicated above, FIG. 5 is provided as an example. Other examples may differ from what is described with respect to FIG. 5.

Figure 6:
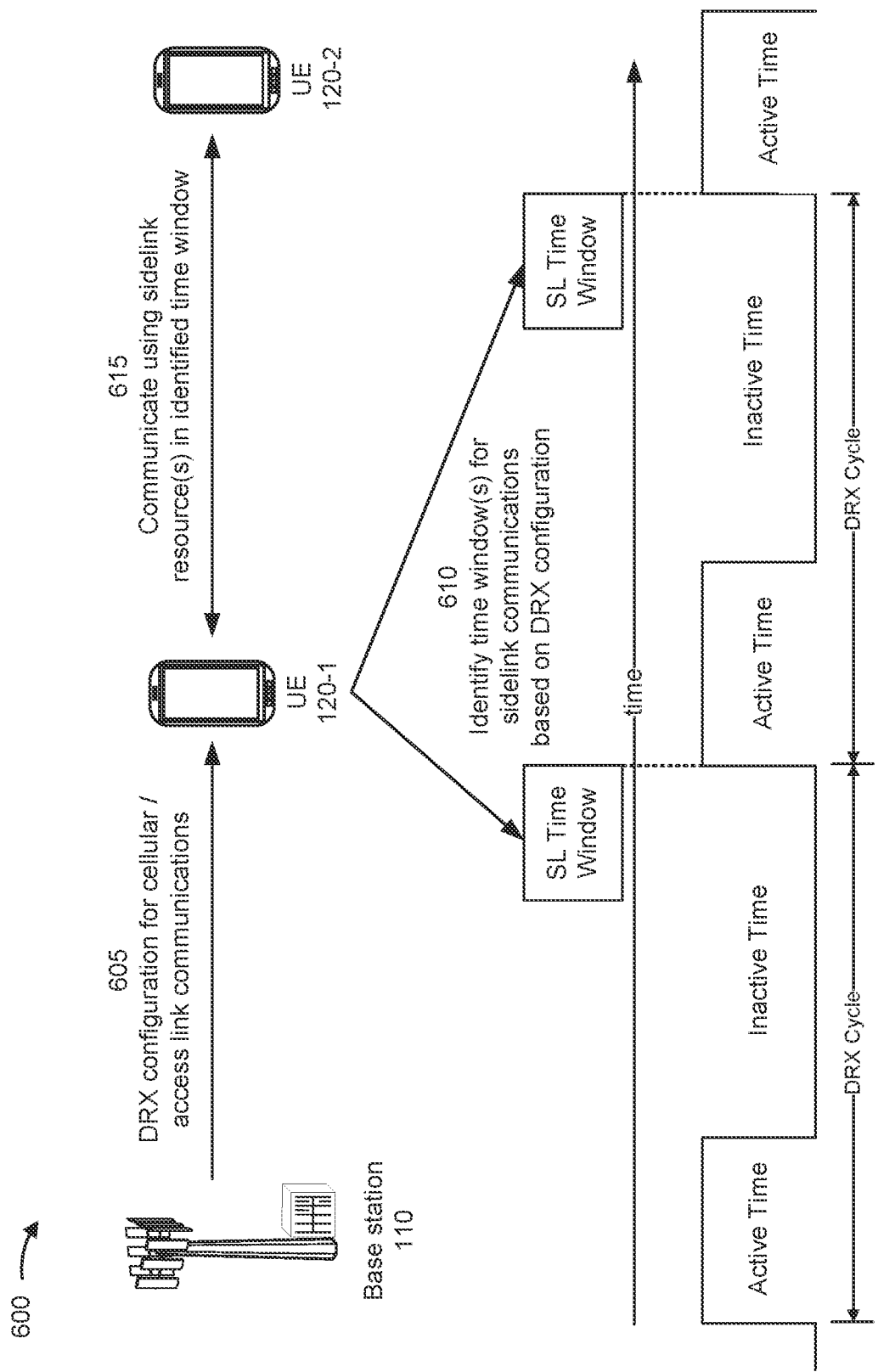
FIGS. 6-9 are diagrams illustrating examples of sidelink communication using a cellular DRX configuration, in accordance with various aspects of the present disclosure.

FIG. 6 is a diagram illustrating an example 600 of sidelink communication using a cellular DRX configuration, in accordance with various aspects of the present disclosure.

As shown in FIG. 6, a base station 110 and a first UE 120-1 may communicate with one another via cellular (e.g., access link) communication, and the first UE 120-1 and a second UE 120-2 may communicate with one another via sidelink communication. In some aspects, a first radio frequency (RF) spectrum band is used for cellular communication between the first UE 120-1 and the base station 110, and a second RF spectrum band is used for sidelink communication between the first UE 120-1 and the second UE 120-2. For example, the cellular communication may use commercial spectrum, licensed spectrum, and/or the like, such as the 3.5 GHz spectrum band. As another example, the sidelink communication may use unlicensed spectrum, Intelligent Transport Spectrum (ITS), and/or the like, such as the 5.9 GHz spectrum band.

As shown by reference number 605, the base station 110 may transmit, to the first UE 120-1, a DRX configuration. Details regarding the DRX configuration are described above in connection with FIG. 5. In some aspects, the base station 110 may transmit the DRX configuration in a radio resource control (RRC) message (e.g., an RRC configuration message, an RRC reconfiguration message, and/or the like), such as for an RRC connected mode DRX configuration. Additionally, or alternatively, the base station 110 may transmit the DRX configuration in a system information block (SIB), such as for an RRC idle mode DRX configuration (e.g., for page monitoring). The DRX configuration may apply to cellular communications (sometimes referred to as access link communications) between the first UE 120-1 and the base station 110. For example, the DRX configuration may indicate a DRX cycle that includes a first time period (e.g., an active time) during which the first UE 120-1 monitors the PDCCH and a second time period (e.g., an inactive time) during which the first UE 120-1 refrains from monitoring the PDCCH. In some cases, the DRX configuration may be referred to as a cellular DRX configuration. The techniques and apparatuses described herein apply to both RRC connected mode DRX configurations and RRC idle mode DRX configurations.

As shown by reference number 610, the first UE 120-1 may identify a time window (e.g., one or more time windows) for sidelink communication with one or more other UEs 120 (e.g., including the second UE 120-2) based at least in part on the DRX configuration. As described elsewhere herein in connection with FIG. 4, sidelink communication may be directly between UEs 120 (e.g., without traversing a base station 110 and, in some cases, without being scheduled by a base station 110), and cellular communication may be directly between a UE 120 and a base station 110 (sometimes referred to as uplink and/or downlink communication).

As shown in FIG. 6, in some aspects, the time window, shown as sidelink (SL) time window, may be included in (e.g., may be the same as or may be a portion of) the DRX inactive time. In FIG. 6, the time window is a portion of the DRX inactive time. However, in some aspects, the time window may be the same as (e.g., may be a same time period with the same start and end as) the DRX inactive time. By using a cellular DRX configuration to implicitly indicate a time window for sidelink communication that occurs during the DRX inactive time, interference and collision between cellular communication and sidelink communication may be reduced.

Alternatively, in some aspects, the time window may be included in (e.g., may be the same as or may be a portion of) the DRX active time. For example, the time window may be a portion of the DRX active time. Alternatively, the time window may be the same as (e.g., may be a same time period with the same start and end as) the DRX active time. By using a cellular DRX configuration to implicitly indicate a time window for sidelink communication that occurs during the DRX active time, UE battery power may be conserved by preserving the DRX inactive time.

In some aspects, the time window may overlap with the DRX active time and the DRX inactive time. For example, a first portion (e.g., an initial portion) of the time window may occur in the DRX active time, and a second portion (e.g., a remaining portion) of the time window may occur in the DRX inactive time. Alternatively, the first portion (e.g., an initial portion) of the time window may occur in the DRX inactive time, and the second portion (e.g., a remaining portion) of the time window may occur in the DRX active time. In this way, sidelink communication may be flexibly configured to achieve a trade-off between preventing interference with cellular communications and conserving UE battery power.

As shown in FIG. 6, in some aspects, the time window may occur once per DRX cycle (e.g., with a particular periodicity). However, in some aspects, the DRX configuration may indicate multiple time windows per DRX cycle. Any particular time window may be reserved for only sidelink reception by the first UE 120-1 (and not sidelink transmission by the first UE 120-1), only sidelink transmission by the first UE 120-1 (and not sidelink reception by the first UE 120-1), or both sidelink reception and sidelink transmission by the first UE 120-1. In some aspects, the DRX configuration may indicate a first time window for only sidelink reception (and not sidelink transmission) and a second time window for only sidelink transmission (and not sidelink reception). In some aspects, the first time window and the second time window may each occur once per DRX cycle.

In some aspects, the DRX configuration may imply (e.g., may implicitly indicate) a duration of the time window (e.g., a duration in number of symbols, slots, and/or the like), a starting boundary and/or ending boundary of the time window (e.g., which may be indicated as an offset from a boundary of the DRX active time or the DRX inactive time), a number of time windows per DRX cycle, and/or the like.

As shown by reference number 615, the first UE 120-1 may communicate with one or more other UEs 120 (e.g., including the second UE 120-2) using one or more sidelink resources included in the identified time window. For example, the one or more sidelink resources may include one or more time domain resources that are included in the time window (e.g., that occur within the boundaries of the time window, such as at or after a start of the time window or at or before an end of the time window). In example 600, the one or more sidelink resources are not configured by and/or are not scheduled by the base station 110. That is, the one or more sidelink resources may be configured by and/or scheduled by one or more UEs 120 (e.g., the first UE 120-1, the second UE 120-2, and/or the like). However, in some aspects, the one or more sidelink resources may be configured by and/or scheduled by the base station 110, as described in more detail below in connection with FIG. 7. In some aspects, the first UE 120-1 may refrain from transmitting and/or receiving sidelink communications outside of the identified time window.

In some aspects, a UE 120 may not be capable of communicating using the first RF spectrum band and the second RF spectrum band at the same time. In this case, cellular communication between the first UE 120-1 and the base station 110 may occur outside of the identified time window, and sidelink communication between the first UE 120-1 and the second UE 120-2 may occur inside of the time window. However, in some aspects, a UE 120 (e.g., a multi-antenna UE 120) may be capable of communicating using the first RF spectrum band and the second RF spectrum band at the same time. In this case, cellular communication and sidelink communication may overlap for the first UE 120-1.

As indicated above, FIG. 6 is provided as an example. Other examples may differ from what is described with regard to FIG. 6. For example, although the first UE 120-1 is shown as communicating with a single other UE 120 (e.g., the second UE 120-2) in FIG. 6, the first UE 120-1 may communicate with multiple other UEs 120 using sidelink communication (e.g., in the identified time window).

By enabling a UE 120 to identify a time window for sidelink communication based at least in part on a DRX configuration intended for cellular (e.g., access link) communication, the UE 120 may be able to monitor for and/or transmit sidelink communications in a limited time window rather than continuously monitoring for and/or transmitting sidelink communications, thereby conserving UE resources, reducing UE power consumption, and conserving UE battery power. Additionally, or alternatively, collisions and/or interference between sidelink communications and cellular communications may be reduced, as described above. Furthermore, the base station 110 may coordinate DRX configurations across multiple UEs 120 served by the base station 110 to enable those UEs 120 to communicate during the sidelink time window with reduced power consumption and signaling.

Figure 7:
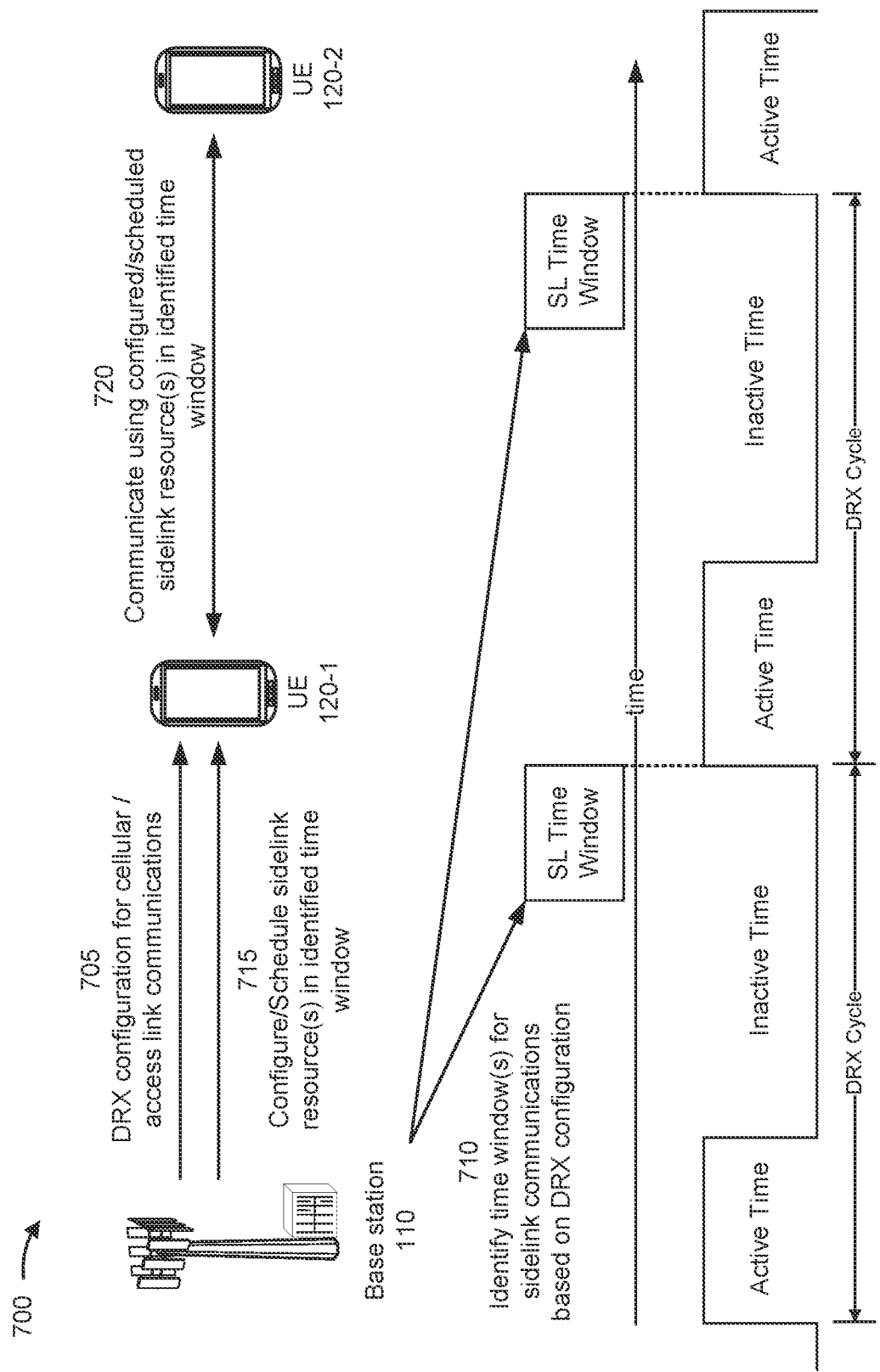

FIG. 7 is a diagram illustrating an example 700 of sidelink communication using a cellular DRX configuration, in accordance with various aspects of the present disclosure. Example 700 of FIG. 7 is similar to example 600 of FIG. 6, except that in example 700, the base station 110 may configure and/or schedule sidelink resources for the first UE 120-1 and/or the second UE 120-2. As shown by reference number 705, the base station 110 may transmit a DRX configuration to the first UE 120-1, as described above in connection with FIG. 5 and FIG. 6.

As shown by reference number 710, the base station 110 may identify a time window (e.g., one or more time windows) for sidelink communication between the first UE 120-1 and one or more other UEs 120 (e.g., including the second UE 120-2) based at least in part on the DRX configuration, in a similar manner as described above in connection with FIG. 6. For example, the time window may have any of the characteristics described above in connection with FIG. 6.

As shown by reference number 715, the base station 110 may configure (e.g., schedule) one or more sidelink resources for the first UE 120-1 in the identified time window. For example, the base station 110 may configure the one or more sidelink resources using control information, such as DCI and/or SCI. A sidelink resource may include, for example, a time domain resource, a frequency domain resource, a spatial domain resource, and/or the like. A sidelink resource may occur in the identified time window (e.g., may include a time domain resource that occurs in the identified time window).

Additionally, or alternatively, the base station 110 may configure (e.g., schedule) one or more cellular communications for the first UE 120-1 outside of the identified time window, thereby reducing interference or collisions between sidelink and cellular communications. In some aspects, the base station 110 may configure or schedule one or more resources (e.g., time domain resources, frequency domain resources, spatial domain resources, and/or the like) for cellular communications using DCI. In some aspects, the base station 110 may schedule cellular communications for the first UE 120-1 to avoid conflicting with sidelink communications scheduled for the first UE 120-1.

As shown by reference number 720, the first UE 120-1 may communicate with one or more other UEs 120 (e.g., including the second UE 120-2) using the one or more sidelink resources configured and/or scheduled by the base station 110 and included in the identified time window, as described above in connection with FIG. 6.

By configuring sidelink resources within a time window that is based at least in part on a DRX configuration intended for cellular (e.g., access link) communication, the base station 110 may be capable of scheduling sidelink resources to reduce UE power consumption or to reduce collisions and/or interference between sidelink communications and cellular communications.

As indicated above, FIG. 7 is provided as an example. Other examples may differ from what is described with regard to FIG. 7.

Figure 8:
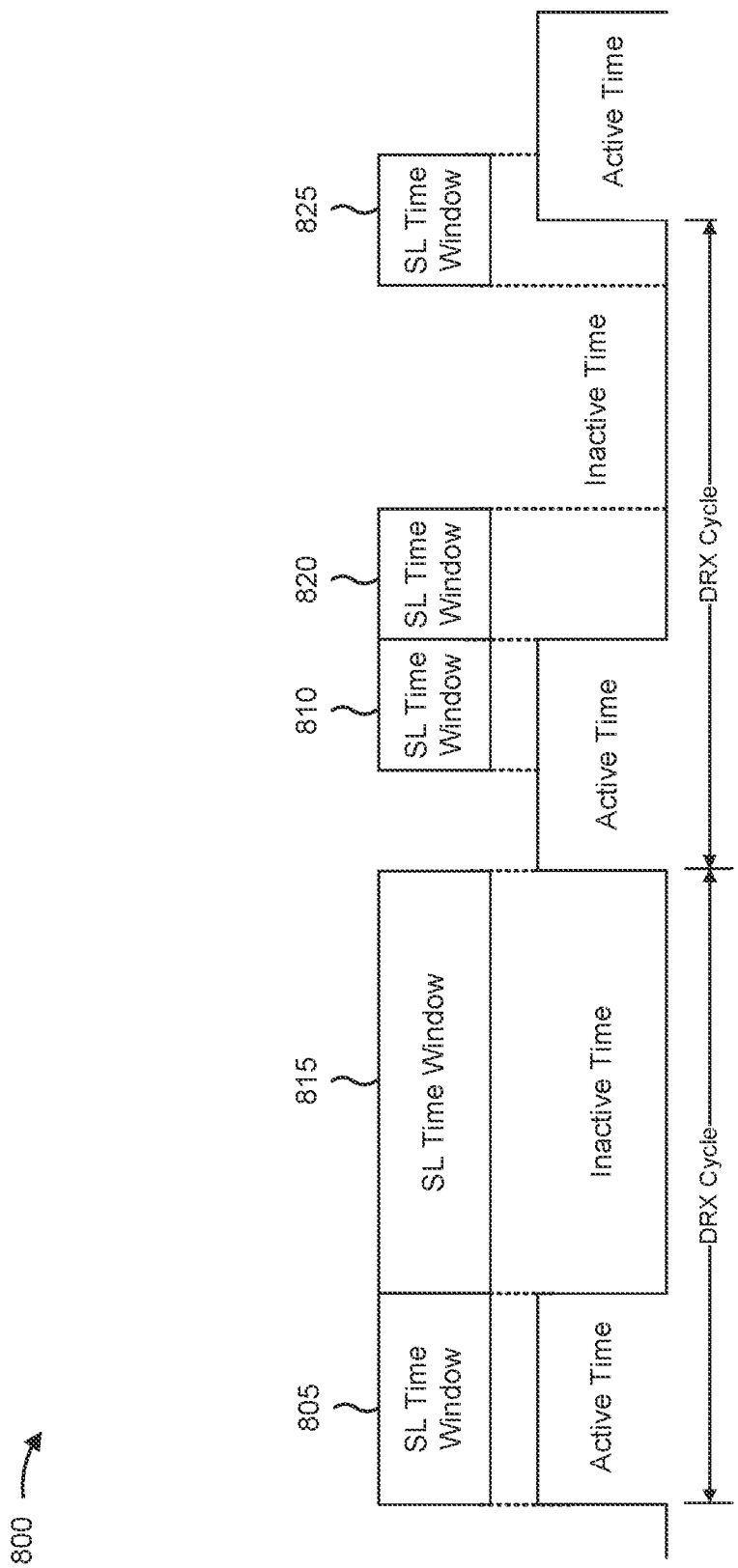

FIG. 8 is a diagram illustrating an example 800 of sidelink communication using a cellular DRX configuration, in accordance with various aspects of the present disclosure. FIG. 8 shows example characteristics of a time window for sidelink communication (sometimes referred to as a sidelink time window or an SL time window), which may be implied, determined, or derived based at least in part on a DRX configuration, as described above in connection with FIGS. 6 and 7.

In some aspects, the sidelink time window may be included in the active time of a DRX cycle. For example, as shown by reference number 805, the sidelink time window may be the same as (e.g., may be a same time period with the same start and end as) the DRX active time. In this case, both boundaries of the DRX active time and the sidelink time window (e.g., a starting time and an ending time of both the DRX active time and the sidelink time window) may be aligned. Alternatively, as shown by reference number 810, the sidelink time window may be a portion of the DRX active time. In some aspects, a single boundary of the DRX active time and the sidelink time window (e.g., shown as an ending boundary, but which may alternatively be a starting boundary) may be aligned. In some aspects, neither boundary of the sidelink time window aligns with a boundary of the DRX active time. By using a cellular DRX configuration to implicitly indicate a time window for sidelink communication that occurs during the DRX active time, UE battery power may be conserved by preserving the DRX inactive time.

In some aspects, the sidelink time window may be included in the inactive time of a DRX cycle. For example, as shown by reference number 815, the sidelink time window may be the same as (e.g., may be a same time period with the same start and end as) the DRX inactive time. In this case, both boundaries of the DRX inactive time and the sidelink time window (e.g., a starting time and an ending time of both the DRX inactive time and the sidelink time window) may be aligned. Alternatively, as shown by reference number 820, the sidelink time window may be a portion of the DRX inactive time. In some aspects, a single boundary of the DRX inactive time and the sidelink time window (e.g., shown as a starting boundary, but which may alternatively be an ending boundary) may be aligned. In some aspects, neither boundary of the sidelink time window aligns with a boundary of the DRX inactive time. By using a cellular DRX configuration to implicitly indicate a time window for sidelink communication that occurs during the DRX inactive time, interference and collision between cellular communication and sidelink communication may be reduced.

As shown by reference number 825, in some aspects, the sidelink time window may overlap with the DRX active time and the DRX inactive time. As shown, in some aspects, a first portion (e.g., an initial portion) of the sidelink time window may occur in the DRX inactive time, and the second portion (e.g., a remaining portion) of the sidelink time window may occur in the DRX active time. Alternatively, the first portion (e.g., an initial portion) of the sidelink time window may occur in the DRX active time, and the second portion (e.g., a remaining portion) of the sidelink time window may occur in the DRX inactive time. In this way, sidelink communication may be flexibly configured to achieve a trade-off between preventing interference with cellular communications and conserving UE battery power.

As indicated above, FIG. 8 is provided as an example. Other examples may differ from what is described with regard to FIG. 8.

Figure 9:
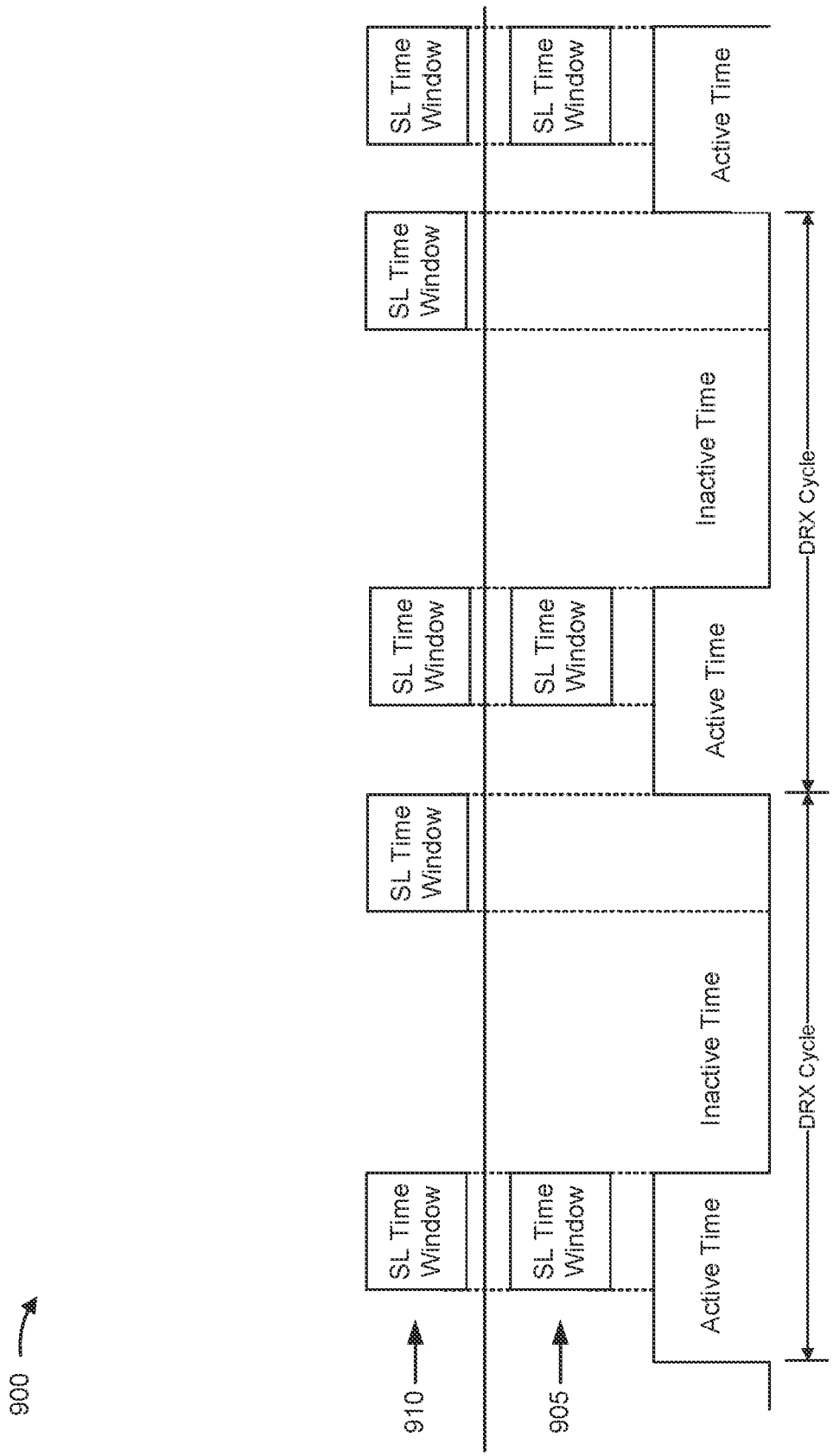

FIG. 9 is a diagram illustrating an example 900 of sidelink communication using a cellular DRX configuration, in accordance with various aspects of the present disclosure. FIG. 9 shows example characteristics of a time window for sidelink communication (sometimes referred to as a sidelink time window or an SL time window), which may be implied, determined, or derived based at least in part on a DRX configuration, as described above in connection with FIGS. 6 and 7.

As shown by reference number 905, in some aspects, the sidelink time window may occur once per DRX cycle (e.g., with a particular periodicity). As shown by reference number 910, in some aspects, the DRX configuration may indicate multiple sidelink time windows per DRX cycle. Any particular time window may be reserved for only sidelink reception by a UE 120 (and not sidelink transmission by the UE 120), only sidelink transmission by the UE 120 (and not sidelink reception by the UE 120), or both sidelink reception and sidelink transmission by the UE 120. In some aspects, the DRX configuration may indicate a first time window for only sidelink reception (and not sidelink transmission) and a second time window for only sidelink transmission (and not sidelink reception). In some aspects, the first time window and the second time window may each occur once per DRX cycle.

As indicated above, FIG. 9 is provided as an example. Other examples may differ from what is described with regard to FIG. 9.

Figure 10:
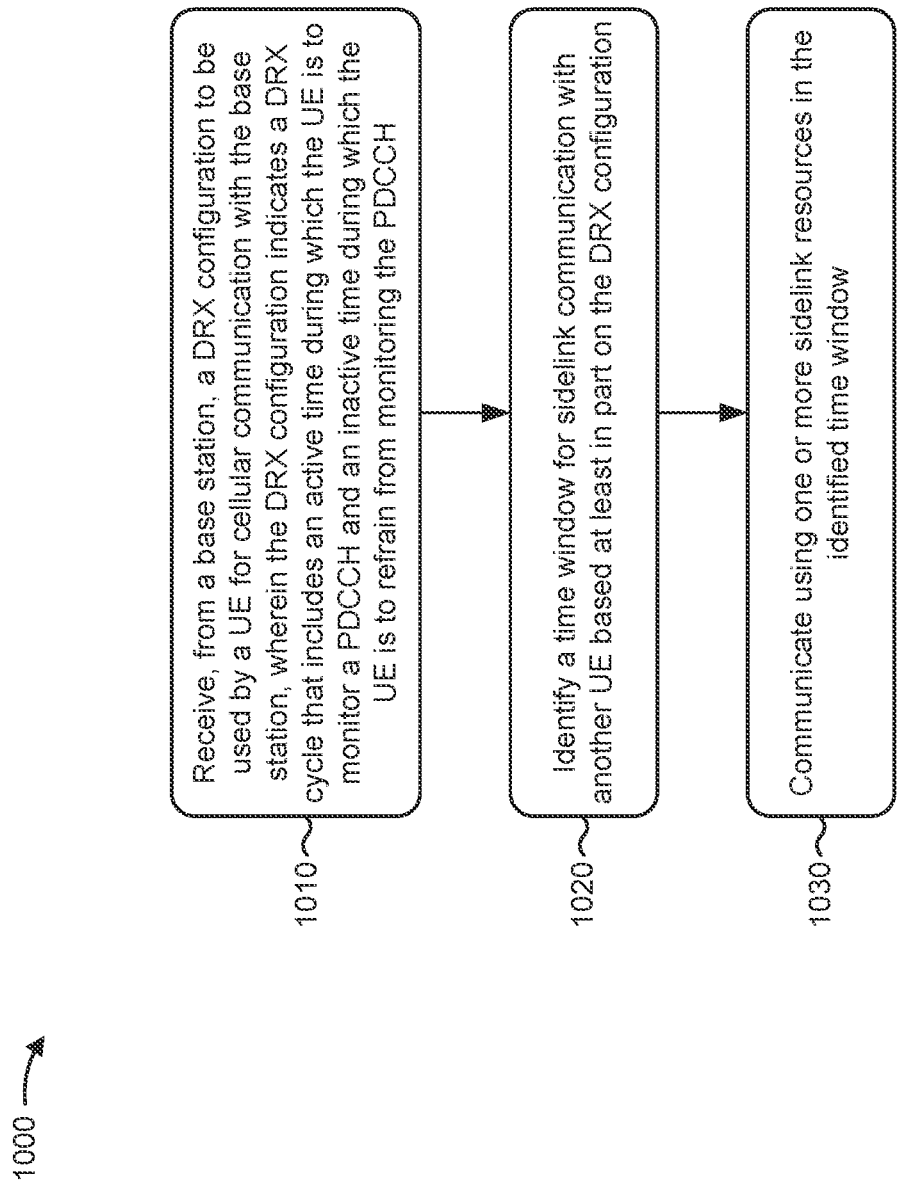
FIG. 10 is a diagram illustrating an example process performed, for example, by a user equipment, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120 and/or the like) performs operations associated with sidelink communication using a cellular DRX configuration.

As shown in FIG. 10, in some aspects, process 1000 may include receiving, from a base station, a DRX configuration to be used by the UE for cellular communication with the base station, wherein the DRX configuration indicates a DRX cycle that includes an active time during which the UE is to monitor a PDCCH and an inactive time during which the UE is to refrain from monitoring the PDCCH (block 1010). For example, the UE (e.g., using receive processor 258, controller/processor 280, memory 282, and/or the like) may receive, from a base station, a DRX configuration to be used by the UE for cellular communication with the base station, as described above. In some aspects, the DRX configuration indicates a DRX cycle that includes an active time during which the UE is to monitor a PDCCH and an inactive time during which the UE is to refrain from monitoring the PDCCH.

As further shown in FIG. 10, in some aspects, process 1000 may include identifying a time window for sidelink communication with another UE based at least in part on the DRX configuration (block 1020). For example, the UE (e.g., using receive processor 258, controller/processor 280, memory 282, and/or the like) may identify a time window for sidelink communication with another UE based at least in part on the DRX configuration, as described above.

As further shown in FIG. 10, in some aspects, process 1000 may include communicating using one or more sidelink resources in the identified time window (block 1030). For example, the UE (e.g., using receive processor 258, transmit processor 264, controller/processor 280, memory 282, and/or the like) may communicate using one or more sidelink resources in the identified time window, as described above.

Process 1000 may include additional aspects, such as any single aspect or any combination of aspects described below and/or in connection with one or more other processes described elsewhere herein.

In a first aspect, the one or more sidelink resources are not configured by the base station.

In a second aspect, alone or in combination with the first aspect, the one or more sidelink resources are configured by the base station.

In a third aspect, alone or in combination with one or more of the first and second aspects, a first radio frequency spectrum band is used for the cellular communication with the base station and a second radio frequency spectrum band is used for the sidelink communication with the other UE.

In a fourth aspect, alone or in combination with one or more of the first through third aspects, the time window is included in the active time of the DRX cycle.

In a fifth aspect, alone or in combination with one or more of the first through fourth aspects, the time window is a same time period as the active time of the DRX cycle.

In a sixth aspect, alone or in combination with one or more of the first through fifth aspects, the time window is a portion of the active time of the DRX cycle.

In a seventh aspect, alone or in combination with one or more of the first through sixth aspects, the time window is included in the inactive time of the DRX cycle.

In an eighth aspect, alone or in combination with one or more of the first through seventh aspects, the time window is a same time period as the inactive time of the DRX cycle.

In a ninth aspect, alone or in combination with one or more of the first through eighth aspects, the time window is a portion of the inactive time of the DRX cycle.

In a tenth aspect, alone or in combination with one or more of the first through ninth aspects, the time window overlaps with the active time and the inactive time.

In an eleventh aspect, alone or in combination with one or more of the first through tenth aspects, the time window occurs once per DRX cycle.

In a twelfth aspect, alone or in combination with one or more of the first through eleventh aspects, the time window is one of multiple time windows, identified based at least in part on the DRX configuration, that occur per DRX cycle.

In a thirteenth aspect, alone or in combination with one or more of the first through twelfth aspects, the time window is used for one of: receiving sidelink communications and not for transmitting sidelink communications, transmitting sidelink communications and not for receiving sidelink communications, or both transmitting and receiving sidelink communications.

In a fourteenth aspect, alone or in combination with one or more of the first through thirteenth aspects, the DRX configuration indicates at least one of a duration of the time window, a starting boundary of the time window, an ending boundary of the time window, a number of time windows per DRX cycle, or a combination thereof.

In a fifteenth aspect, alone or in combination with one or more of the first through fourteenth aspects, identifying the time window for sidelink communication includes identifying the time window for sidelink communication based at least in part on at least one of the active time or the inactive time.

In a sixteenth aspect, alone or in combination with one or more of the first through fifteenth aspects, identifying the time window for sidelink communication includes identifying at least one of a duration of the time window, a starting boundary of the time window, or an ending boundary of the time window based at least in part on the DRX configuration.

In a seventeenth aspect, alone or in combination with one or more of the first through sixteenth aspects, a boundary of the time window for sidelink communication is aligned with a boundary of the active time.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a base station, in accordance with various aspects of the present disclosure. Example process 1100 is an example where the base station (e.g., base station 110 and/or the like) performs operations associated with sidelink communication using a cellular DRX configuration.

As shown in FIG. 11, in some aspects, process 1100 may include transmitting, to a UE, a DRX configuration to be used by the UE for cellular communication with the base station, wherein the DRX configuration indicates a DRX cycle that includes an active time during which the UE is to monitor a PDCCH and an inactive time during which the UE is to refrain from monitoring the PDCCH (block 1110). For example, the base station (e.g., using transmit processor 220, controller/processor 240, memory 242, and/or the like) may transmit, to a UE, a DRX configuration to be used by the UE for cellular communication with the base station, as described above. In some aspects, the DRX configuration indicates a DRX cycle that includes an active time during which the UE is to monitor a PDCCH and an inactive time during which the UE is to refrain from monitoring the PDCCH.

As further shown in FIG. 11, in some aspects, process 1100 may include identifying a time window for sidelink communication between the UE and another UE based at least in part on the DRX configuration (block 1120). For example, the base station (e.g., using transmit processor 220, receive processor 238, controller/processor 240, memory 242, and/or the like) may identify a time window for sidelink communication between the UE and another UE based at least in part on the DRX configuration, as described above.

As further shown in FIG. 11, in some aspects, process 1100 may include configuring and/or communicating one or more sidelink resources for the UE in the identified time window (block 1130). For example, the base station (e.g., using transmit processor 220, receive processor 238, controller/processor 240, memory 242, and/or the like) may configure one or more sidelink resources for the UE in the identified time window, as described above. The base station 110 may communicate the configured one or more sidelink resources to the UE, such as in downlink control information or another message.

Process 1100 may include additional aspects, such as any single aspect or any combination of aspects described below and/or in connection with one or more other processes described elsewhere herein.

In a first aspect, process 1100 includes scheduling one or more cellular communications between the UE and the base station outside of the identified time window.

In a second aspect, alone or in combination with the first aspect, a first radio frequency spectrum band is used for the cellular communication and a second radio frequency spectrum band is used for the sidelink communication.

In a third aspect, alone or in combination with one or more of the first and second aspects, the time window is at least one of: included in the active time of the DRX cycle, a same time period as the active time of the DRX cycle, a portion of the active time of the DRX cycle, included in the inactive time of the DRX cycle, a same time period as the inactive time of the DRX cycle, a portion of the inactive time of the DRX cycle, or overlapping with the active time of the DRX cycle and the inactive time of the DRX cycle.

In a fourth aspect, alone or in combination with one or more of the first through third aspects, the time window occurs once per DRX cycle.

In a fifth aspect, alone or in combination with one or more of the first through fourth aspects, the time window is one of multiple time windows, identified based at least in part on the DRX configuration, that occur per DRX cycle.

In a sixth aspect, alone or in combination with one or more of the first through fifth aspects, the time window is used for one of: receiving sidelink communications and not for transmitting sidelink communications, transmitting sidelink communications and not for receiving sidelink communications, or both transmitting and receiving sidelink communications.

In a seventh aspect, alone or in combination with one or more of the first through sixth aspects, the DRX configuration indicates at least one of a duration of the time window, a starting boundary of the time window, an ending boundary of the time window, a number of time windows per DRX cycle, or a combination thereof.

In an eighth aspect, alone or in combination with one or more of the first through seventh aspects, identifying the time window for sidelink communication includes identifying the time window for sidelink communication based at least in part on at least one of the active time or the inactive time.

In a ninth aspect, alone or in combination with one or more of the first through eighth aspects, identifying the time window for sidelink communication includes identifying at least one of a duration of the time window, a starting boundary of the time window, or an ending boundary of the time window based at least in part on the DRX configuration.

In a tenth aspect, alone or in combination with one or more of the first through ninth aspects, a boundary of the time window for sidelink communication is aligned with a boundary of the active time.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, from a network entity, a discontinuous reception (DRX) configuration to be used by the UE for cellular communication, wherein the DRX configuration indicates a DRX cycle that includes a DRX on duration and an opportunity to enter a DRX sleep state;
   identifying a sidelink time window for communication with another UE based at least in part on the DRX configuration; and
   communicating using one or more sidelink resources in the sidelink time window, at least a portion of the sidelink time window being included in a DRX active time, wherein the DRX active time indicates a time during which the UE monitors a physical downlink control channel (PDCCH) within the DRX on duration, and wherein the sidelink time window is used for transmitting sidelink communications and not for receiving sidelink communications.

2. The method of claim 1, wherein the one or more sidelink resources are configured by the UE and are not configured by the network entity.

3. The method of claim 1, wherein the DRX active time and the sidelink time window are aligned.

4. The method of claim 1, wherein the sidelink time window overlaps with the DRX active time and a DRX inactive time.

5. The method of claim 4, wherein a first portion of the sidelink time window occurs in the DRX active time and a second portion of the sidelink time window occurs in the DRX inactive time.

6. The method of claim 1, wherein the sidelink time window is a portion of the DRX active time.

7. The method of claim 1, wherein the DRX configuration is received in at least one of a radio resource control (RRC) message or a system information block (SIB).

8. The method of claim 1, wherein the sidelink time window occurs once per DRX cycle.

9. A user equipment (UE) for wireless communication, comprising:
   a memory; and
   one or more processors, coupled to the memory, configured to:
      receive, from a network entity, a discontinuous reception (DRX) configuration to be used by the UE for cellular communication, wherein the DRX configuration indicates a DRX cycle that includes a DRX on duration and an opportunity to enter a DRX sleep state;
      identify a sidelink time window for communication with another UE based at least in part on the DRX configuration; and
      communicate using one or more sidelink resources in the sidelink time window, at least a portion of the sidelink time window being included in a DRX active time, wherein the DRX active time indicates a time during which the UE monitors a physical downlink control channel (PDCCH) within the DRX on duration, and wherein the sidelink time window is used for transmitting sidelink communications and not for receiving sidelink communications.

10. The UE of claim 9, wherein the one or more sidelink resources are configured by the UE and are not configured by the network entity.

11. The UE of claim 9, wherein the DRX active time and the sidelink time window are aligned.

12. The UE of claim 9, wherein the sidelink time window overlaps with the DRX active time and a DRX inactive time.

13. The UE of claim 12, wherein a first portion of the sidelink time window occurs in the DRX active time and a second portion of the sidelink time window occurs in the DRX inactive time.

14. The UE of claim 9, wherein the sidelink time window is a portion of the DRX active time.

15. The UE of claim 9, wherein the DRX configuration is received in at least one of a radio resource control (RRC) message or a system information block (SIB).

16. The UE of claim 9, wherein the sidelink time window occurs once per DRX cycle.

17. A non-transitory computer-readable medium storing a set of instructions for wireless communication, the set of instructions comprising:
one or more instructions that, when executed by one or more processors of a user equipment (UE), cause the UE to:
receive, from a network entity, a discontinuous reception (DRX) configuration to be used by the UE for cellular communication, wherein the DRX configuration indicates a DRX cycle that includes a DRX on duration and an opportunity to enter a DRX sleep state;
identify a sidelink time window for communication with another UE based at least in part on the DRX configuration; and
communicate using one or more sidelink resources in the sidelink time window, at least a portion of the sidelink time window being included in a DRX active time, wherein the DRX active time indicates a time during which the UE monitors a physical downlink control channel (PDCCH) within the DRX on duration, and wherein the sidelink time window is used for transmitting sidelink communications and not for receiving sidelink communications.

18. The non-transitory computer-readable medium of claim 17, wherein the one or more sidelink resources are configured by the UE and are not configured by the network entity.

19. The non-transitory computer-readable medium of claim 17, wherein the DRX active time and the sidelink time window are aligned.

20. The non-transitory computer-readable medium of claim 17, wherein the sidelink time window overlaps with the DRX active time and a DRX inactive time.

21. The non-transitory computer-readable medium of claim 20, wherein a first portion of the sidelink time window occurs in the DRX active time and a second portion of the sidelink time window occurs in the DRX inactive time.

22. The non-transitory computer-readable medium of claim 17, wherein the sidelink time window is a portion of the DRX active time.

23. The non-transitory computer-readable medium of claim 17, wherein the DRX configuration is received in at least one of a radio resource control (RRC) message or a system information block (SIB).

24. The non-transitory computer-readable medium of claim 17, wherein the sidelink time window occurs once per DRX cycle.

25. An apparatus for wireless communication, comprising:
means for receiving, from a network entity, a discontinuous reception (DRX) configuration to be used by the apparatus for cellular communication, wherein the DRX configuration indicates a DRX cycle that includes a DRX on duration and an opportunity to enter a DRX sleep state;
means for identifying a sidelink time window for communication with another apparatus based at least in part on the DRX configuration; and
means for communicating using one or more sidelink resources in the sidelink time window, at least a portion of the sidelink time window being included in a DRX active time wherein the DRX active time indicates a time during which the UE monitors a physical downlink control channel (PDCCH) within the DRX on duration, and wherein the sidelink time window is used for transmitting sidelink communications and not for receiving sidelink communications.

26. The apparatus of claim 25, wherein the one or more sidelink resources are configured by the UE and are not configured by the network entity.

27. The apparatus of claim 25, wherein the DRX active time and the sidelink time window are aligned.

28. The apparatus of claim 25, wherein the sidelink time window overlaps with the DRX active time and a DRX inactive time.

29. The apparatus of claim 28, wherein a first portion of the sidelink time window occurs in the DRX active time and a second portion of the sidelink time window occurs in the DRX inactive time.

30. The apparatus of claim 25, wherein the sidelink time window is a portion of the DRX active time.

* * * * *